United States Patent
Khachaturov et al.

(10) Patent No.: US 10,192,424 B2
(45) Date of Patent: Jan. 29, 2019

(54) GEOGRAPHIC REMINDERS

(71) Applicant: Microsoft Technology Licensing, LLC, Redmond, WA (US)

(72) Inventors: Vassilii Khachaturov, Lehavim (IL); Lev Novik, Bellevue, WA (US); Moe Khosravy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/029,772

(22) Filed: Sep. 17, 2013

(65) Prior Publication Data
US 2014/0009285 A1    Jan. 9, 2014

Related U.S. Application Data

(63) Continuation of application No. 12/468,874, filed on May 20, 2009, now Pat. No. 8,537,003.

(51) Int. Cl.
  *G08B 1/08* (2006.01)
  *G08B 1/00* (2006.01)
  *G08B 21/24* (2006.01)
  *G06Q 10/10* (2012.01)

(52) U.S. Cl.
  CPC .......... *G08B 21/24* (2013.01); *G06Q 10/109* (2013.01)

(58) Field of Classification Search
  CPC combination set(s) only.
  See application file for complete search history.

(56) References Cited

U.S. PATENT DOCUMENTS

| | | |
|---|---|---|
| 6,084,528 A | 7/2000 | Beach et al. |
| 6,587,835 B1 | 7/2003 | Treyz et al. |
| 6,680,675 B1 | 1/2004 | Suzuki |
| 6,850,837 B2 | 2/2005 | Paulauskas et al. |
| 7,082,365 B2 | 7/2006 | Sheha et al. |
| 7,394,405 B2 | 7/2008 | Godden |
| 7,528,713 B2 | 5/2009 | Singh et al. |

(Continued)

OTHER PUBLICATIONS

Nedos, et al., "LATTE: Location and Time Triggered Email", Retrieved at «https://www.cs.tcd.ie/publications/tech-reports/reports.04/TCD-CS-2004-32.pdf» on Sep. 16, 2015, pp. 1-14.

(Continued)

*Primary Examiner* — Nabil H Syed
*Assistant Examiner* — Cal Eustaquio
(74) *Attorney, Agent, or Firm* — Davin Chin; Chin IP, PLLC (57) ABSTRACT

Described is a technology by which a mobile device outputs an alert for a reminder based upon a current location of the mobile device with respect to an entity (person, place or thing) associated with the reminder. The reminders may be maintained and provided by a service. Each reminder includes a reference to target-related information. When the device moves to within a threshold proximity of the target, and other criteria (e.g., time of day) is satisfied, an alert is output by the device. A user may gesture with a device towards an entity to set a reminder associated with that entity, or to get any reminder associated with that entity. A device may also get reminders by scanning or image processing, e.g., by reading a barcode associated with a product to get any reminders associated with that product.

20 Claims, 5 Drawing Sheets

(56) References Cited

U.S. PATENT DOCUMENTS

| | | | |
|---|---|---|---|
| 7,577,522 | B2 | 8/2009 | Rosenberg |
| 2001/0040590 | A1 | 11/2001 | Abbott et al. |
| 2002/0044690 | A1* | 4/2002 | Burgess .................. 382/209 |
| 2003/0132950 | A1* | 7/2003 | Surucu et al. ............. 345/700 |
| 2004/0148611 | A1* | 7/2004 | Manion ............... H04L 29/06 719/328 |
| 2006/0059003 | A1 | 3/2006 | Requena et al. |
| 2006/0077055 | A1* | 4/2006 | Basir ................... 340/539.13 |
| 2006/0111957 | A1* | 5/2006 | Carmi ........... G06Q 10/0631 705/7.16 |
| 2006/0120686 | A1* | 6/2006 | Liebenow ................. 386/40 |
| 2006/0200382 | A1 | 9/2006 | Arutunian et al. |
| 2006/0241864 | A1 | 10/2006 | Rosenberg |
| 2006/0256007 | A1* | 11/2006 | Rosenberg ............ 342/357.08 |
| 2007/0037614 | A1* | 2/2007 | Rosenberg .............. 455/575.1 |
| 2007/0130427 | A1* | 6/2007 | Lahti et al. ................ 711/133 |
| 2008/0032703 | A1 | 2/2008 | Krumm et al. |
| 2008/0045236 | A1 | 2/2008 | Nahon et al. |
| 2008/0133126 | A1 | 6/2008 | Dupray |
| 2008/0167937 | A1 | 7/2008 | Coughlin et al. |
| 2009/0054077 | A1* | 2/2009 | Gauthier ............... G06F 3/014 455/456.1 |
| 2009/0102676 | A1* | 4/2009 | Hoffmann ............ G08B 21/24 340/686.6 |
| 2009/0239552 | A1 | 9/2009 | Churchill et al. |
| 2009/0281718 | A1 | 11/2009 | Gibran et al. |
| 2010/0178903 | A1 | 7/2010 | Tofighbakhsh et al. |

OTHER PUBLICATIONS

"GPS Software for Cell Phones, Update Nov. 2008", Retrieved at «http://www.gps-practice-and-fun.com/gps-software-for-cell-phones-update.html», pp. 7.

d'Egara Rambla, "Mobile Geo: The World in your Pocket", Retrieved at «http://www.codefactory.es/descargas/family_3/product_15/Mobile_Geo_User_Guide.htm», Retrieved on Jan. 23, 2009; pp. 52.

"Non-Final Office Action Received for U.S. Appl. No. 12/468,874", dated Sep. 1, 2011, 10 Pages.

"Final Office Action in U.S. Appl. No. 12/468,874", dated Feb. 16, 2012, 12 Pages.

"Non-Final Office Action Received for U.S. Appl. No. 12/468,874", dated Sep. 13, 2012, 12 Pages.

"Notice of Allowance Received for U.S. Appl. No. 12/468,874", dated May 17, 2013, 9 Pages.

* cited by examiner

GEOGRAPHIC REMINDERS

BACKGROUND

GPS-enabled and other location aware devices, whether dedicated devices or incorporated into another device such as a cellular telephone, provide users with valuable information. Typical information comprises current traveling direction, current location and current speed data, displayed relative to a map. Other information that may be provided includes spoken directions.

However, such devices are neither particularly dynamic nor adaptable to anything other than performing re-routing. For example, if a user makes a wrong turn, takes a detour or otherwise deviates from an initially planned route, some devices automatically recalculate a revised route. This also occurs if a user requests route recalculation to avoid traffic. Thus, while the devices appear to users to have some intelligence, that perceived intelligence is generally limited to choosing an alternate route. Devices that are set with typical personal information management functionality have this functionality limited to trip planning (including, but not limited to functionality such as meeting scheduling, contacts, and associated reminders).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a mobile device outputs an alert for a reminder associated with an entity (person, place or thing) when criteria associated with the reminder is satisfied, including when the device is within a threshold proximity of that entity. A reminder includes a reference to target-related information. When the device moves to within the threshold proximity of the target, and other criteria is satisfied, an alert is output by the device. For example, when a user's device approaches a place of business that is associated with a reminder, and the current time meets the hours of operation specified as a criterion for triggering the alert, the alert is triggered.

In one aspect, the reminders are maintained at a service for various users, with selected reminders provided to each user's device based upon profile data of that user and (possibly) the user's current location. The reminders may be in the form of objects, which contain references to target objects that correspond to the person, place or thing being targeted.

In one aspect, a user may gesture with a device towards a person, place or thing to generate (set) a reminder associated with that object. A user also may gesture with a device towards a person, place or thing to get any reminder associated with that object. A device may also scan or process an image of entity to identify that entity, such as a picture of a store taken with a built-in camera, or to read a barcode associated with a product, to get any reminders associated with that entity.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards geographically-specific reminders that are presented to a user of a mobile (e.g., handheld) device at appropriate times and/or otherwise in an appropriate context, whereby a user perceives the device as being intelligent with respect to providing those reminders. A geographic reminder, in general, comprises an association of a particular user experience with an alert triggered by a function when pre-defined criteria are met. By way of one example, a user may receive a geographic reminder to pick up dry cleaning that is ready, but only when within a threshold proximity (e.g., 500 feet) of that particular drycleaner's storefront, during off-work hours, and when that dry cleaner's storefront is open.

In one aspect, this is provided via a service that delivers geographic reminders to devices that include geographically-aware mobile user agents, in a manner that is aware of each user agent's movement patterns, as well as any constraints (e.g., based upon current speed). The geographic reminders that are provided may be only those that apply (or may apply) based upon a current location, e.g., a user may have specified geographic reminders that span various locations along the West Coast of the United States, but only those that are within some boundary (e.g., a 100 mile radius) of the user's current location may be delivered. The device may cache such reminders and include logic that decides when the triggering criterion or criteria is met.

While some of the examples described herein are directed towards business-related geographic reminders, it is understood that these are non-limiting examples. Other uses include non-business locations (e.g., a church meeting), a person (meet with Joe, or drop something off at Joe's house when nearby) or a thing (e.g., buy item X when near a store that has it in stock at a certain price). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and the communication of information in general.

Figure 1:
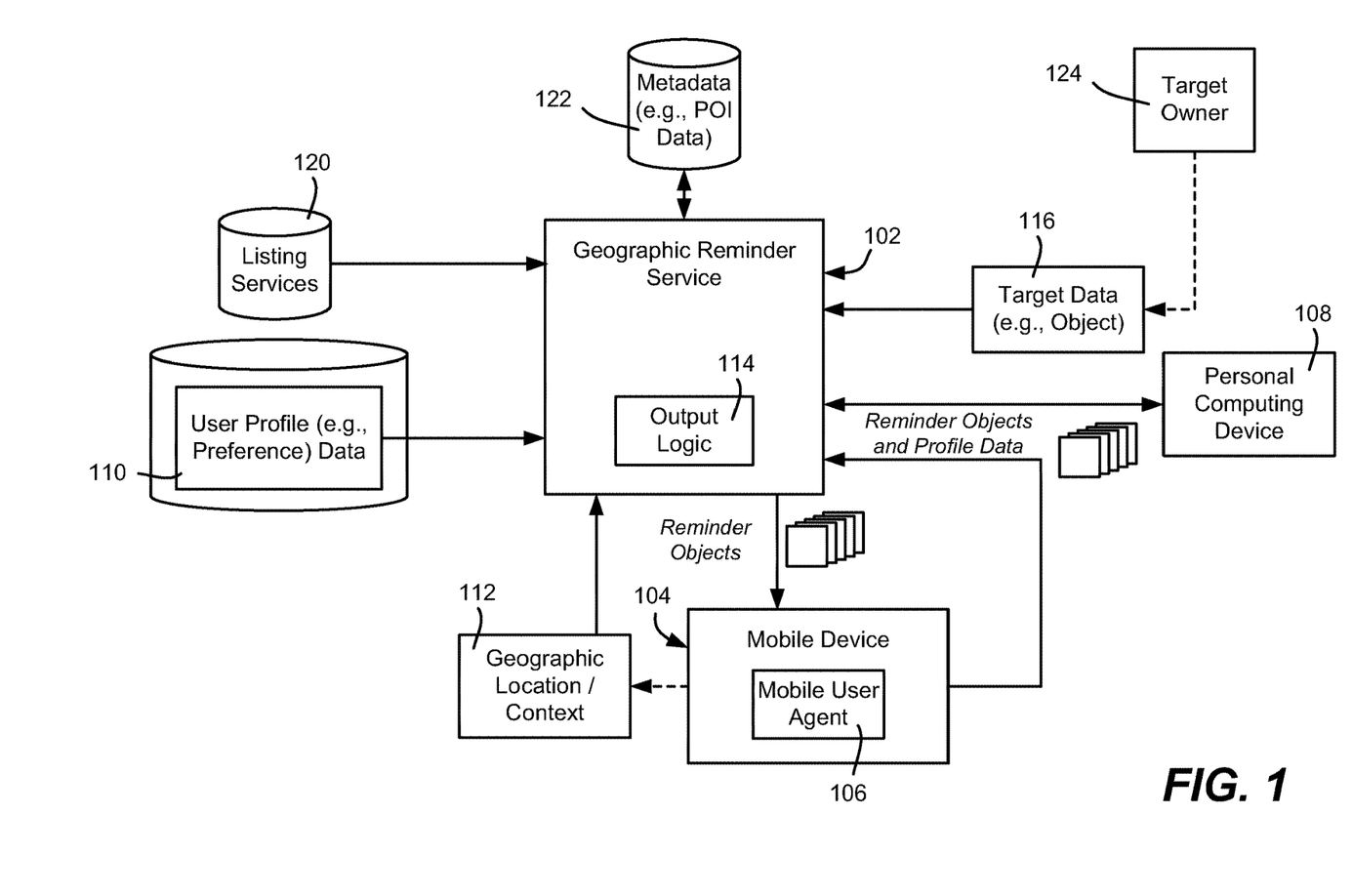
FIG. 1 is a block diagram showing an example implementation of a geographic reminder service that provides location-related reminders to mobile devices.

Turning to FIG. 1, there is shown an example embodiment in the form of a geographic reminder service 102 that collects, maintains and outputs various geographic reminder data for various users. In one implementation, this is a cloud service; however alternative implementations are feasible, such as to have the service run as a user application program that the user may access remotely.

In general, the geographic reminder service 102 maintains a full set of reminders for each user, and provides the reminders (e.g., the full set or a reduced subset thereof) as objects or other suitable data structures to a mobile device 104 of the user that appropriately outputs the reminders. Note that although a handheld device is one example of a mobile device, any generally mobile device is equivalent, such as one that is part of a navigation system built into a vehicle dashboard, a system provided for access from an airplane seat, or the like. Further, note that although only one such user and mobile device 104 is represented in FIG. 1, it is understood that the actual service handles thousands or millions of users/devices.

The communication between the service 102 and the mobile device 104 may be over any suitable media, such as Wi-Fi, cellular telephone, or other wireless internet mechanism. Wired media is also feasible, although the user will have to physically connect to receive any reminder (e.g., a new reminder) that is not otherwise cached on the mobile device 104, and then cache such reminders.

As shown in FIG. 1, the device 104 includes a mobile user agent 106 in the form of logic and/or software that processes the reminders, as generally described below with reference to FIGS. 3 and 4. Note that this may include caching the reminders and applying logic as to whether and when to output each reminder, so that, for example, the mobile device 104 need not be in constant or even regular communication with the geographic reminder service 102 in order to provide the reminders.

The user may provide various data including reminders for that user to the service 102 via the mobile device 104, and/or via another computing device such as a personal computing device 108. In one implementation, such data is provided in the form of reminder objects and/or other suitable data structures. In general, the user experience while setting a geographic reminder is to have some input data translated into a relevant query/object and submitted to the device and/or the service, which may further extract relevant parameters. This may be done in an interactive way, possibly reusing past experiences of the user interaction with the system. Note that (subject to privacy considerations) the experiences of multiple users may be reused to facilitate setting of geographic reminders by other users. The parameters may be resource-specific, system-specific, time-specific, locality-specific, based upon relative priorities (absolute or adjustable through the other parameters) and so forth. Specific parameters may vary by type of the entity with which a geographic reminder is associated; they can further be combined in complex chained queries to extract additional parameters to be used in the reminder/notification alert.

Reminders may be emailed or otherwise transferred (e.g., through a file share or instant message communication) between users. The underlying query may be automatically or semi-automatically (i.e., with some human help) translated according to the recipient's locality specifics. For example, if an urban dweller delegates a grocery purchase to someone residing in a rural locale, the service may notice that the average distance to the nearest rural grocery store is significantly larger than in the city. The user may then be queried, and may elect to re-target the reminder to various farm stands.

In addition to reminder-related data, a user may provide user profile-related data 110. More particularly, the service 102 maintains user profile data 110 as provided by each user. For example, a user may specify in his or her profile data 110 that only certain businesses are to be candidates for a reminder, and/or exclude certain others. As a more particular example, a user may enter a reminder such as "pick up milk if I am within a ten minutes drive of any grocery store rated at least four stars in my profile." Other, more general types of preferences may be specified, e.g., "do not provide any reminders when I am within 200 feet of my office and it is between 9:00 am and 12:00 pm or between 1:00 pm and 5:00 pm."

To obtain reminders, the device 104 may provide the service with its current geographic location and/or other context data 112. For example, the user may do this on a regular basis, and/or every time the user moves a certain threshold distance from the location that the data 112 was last reported. One typical example of other context data is the user's current time, speed and direction. Another example of other context data may be data that corresponds to how often the user is to receive a reminder, e.g., more frequently if the device has limited memory and can only cache a small number of reminders, such as only those associated with a relatively small geographic area.

In general, the service 102 includes output logic 114 (described below with reference to FIG. 2) that determines when to provide reminders to the mobile user agent 106. Reminders may be output based upon a user's current location, the current time of day, and/or the user profile data 110. Reminders may also be output based upon where the user is moving and (as described above) how much caching ability the device 104 has. For example, the user may receive all reminders (and associated target data as described below) that exist within a set of tiles (each tile being a geographic area, for example) based upon the user's current location, with the number of tiles determined by how many reminders the device's object cache 330 (FIG. 3) can hold. As the user moves, the reminders (including any points of interest) corresponding to new tiles may be pre-fetched in the direction of the movement, while others are removed. Pre-fetching may be based upon current speed or other information, e.g., when flying on an airplane, pre-fetch reminders for tiles further in advance (such as surrounding the destination airport, if known) than when driving.

In one implementation, each reminder comprises a reminder object that may be communicated as a byte stream. Each reminder object has an identifier (e.g., a GUID) for itself, and a target identifier that describes what that object is tied to (person, place or thing) in terms of a location or set of locations. A reminder object also has a start time and an end time (or a start time and duration) that indicates when it is acceptable to output a reminder (as long as any other criterion is also met), and may have an expiration date or other information (e.g., a one-time reminder) that indicates when that object is to be removed from the device 104.

Further, the user experience with respect to a reminder may be predefined, such as to provide an audible warning, and/or have a text or video message displayed), and/or may be scriptable/programmable (fire a system event, launch an application, switch off an appliance, dial a telephone number). Thus, other information that a reminder object may contain is output content, such as audio, text, graphics and/or video that is output on the device 104 when the reminder is triggered. The output alert may be a direct notification such as audible output (e.g., speech or sound on the device), a vibration or other tactile feedback, visible output (e.g., graphics, video, text, device effects such as flashing or lighting up), or a more indirect notification such as a text message, a telephone call, an email, an instant message and so forth.

Each set of target data 116 that is referenced by an object identifier also may be in the form of a target object, such as also identified via a GUID. Thus, for example, a certain store may be identified with a target object, as may a person's house, thereby providing a location that can be used to trigger a reminder. A product or service may be tied to a target object.

Note that a target object is not necessarily tied to a single location and thus may have multiple locations, e.g., a "mail package" reminder may be triggered for any post office that is open for business at that time; any location of a particular food franchise may trigger a "pick up dinner" reminder. Any of these points of interest along the users path or otherwise within a range of the user's current location may trigger a reminder. Thus, a target object may represent a pre-defined special category rather than a single location/business. Note that a user may tag a business (a listing service entry) or a location to match some category (e.g., "dry-cleaners") and consent to have this knowledge incorporated by the service, (possibly also alerting an upstream database content provider), so that other users later have such information predefined.

The target data 116 for each target object may be obtained from various listing services 120 such as a business directory, and may be maintained as point-of-interest (POI) data 122 for various targets, (which may include other backing database metadata not necessarily tied to a single location). In general, this includes location data, and may include telephone numbers and so forth. However, additional information not found in any listing services may be present within (or linked to via) the target object, such as hours of operation, which may be determined from another source, or provided by the owner of 124 that target data. Still further, a target object may be associated with a product and may contain information about that product, such as a one-dimensional or two-dimensional barcode, RFID data, or any other suitable product identifier. Coupons, menus, advertisements, reviews, listings, and generally any data that is relevant for a target may be present within (or linked to via) a target object.

Thus, the target object may be somewhat dynamic, and may be updated for an individual user before sending to that user. By way of example, a target object may represent "any grocery store within a two-mile radius of the user's current location." When such a target object is provided to a user, the data inside may be updated with all grocery stores that meet that location criterion, along with each one's particular location and hours of operation, whereby the mobile user agent 106 can decide which particular one is applicable (e.g., open and approaching within 500 feet) when outputting a reminder. Alternatively, the reminder object can be associated with multiple target objects to accomplish the same result, and those target objects may be dynamically updated, e.g., as the user moves. The split between the client-side and server-side workloads of the business logic can vary dependent on the types of workload and the device processing capabilities.

In one aspect, a target object may have an authorized owner 124 that is allowed to modify the information in the target object. For example, a business owner can change the hours of operation maintained in the target object's data. A product that was previously listed as "backordered" may be changed to "in stock" or the like, or vice-versa. As described below, because the target information is retrieved with respect to processing a reminder, the decision on whether and/or how and when to remind a user may be based on relatively current information.

Figure 2:
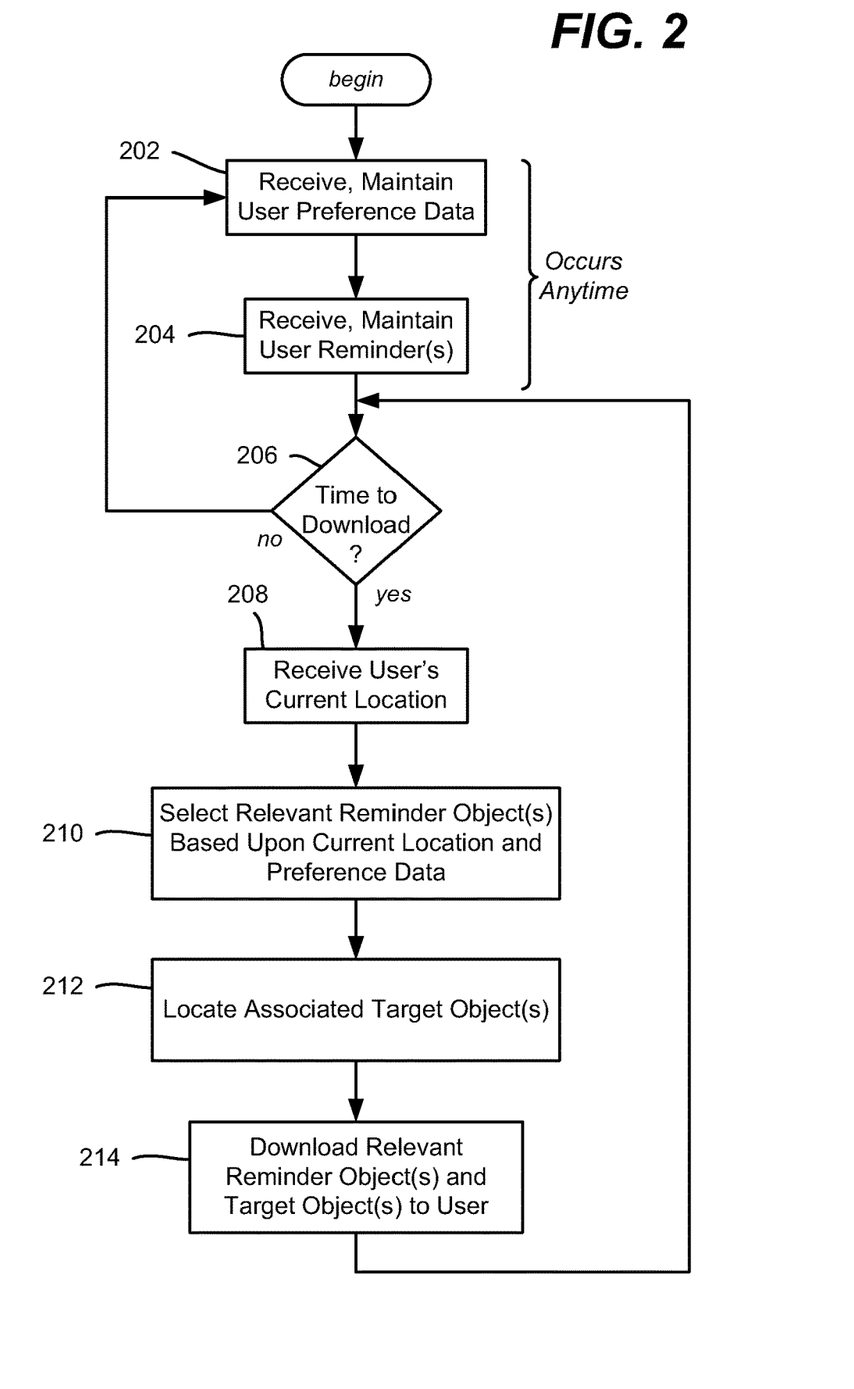
FIG. 2 is a flow diagram representing example steps taken by a geographic reminder service with respect to providing location-related reminders.

FIG. 2 summarizes various operations performed by the service 102, beginning at step 202 where the user preference data is received. Step 204 represents receiving one or more reminders for that user. Note that steps 202 and 204 are capable of occurring at any time, and are generally not part of the regular updates of the reminders provided by the service 102, but are shown for completeness.

Step 206 represents evaluating whether it is time to download an updated set of reminders to the user; if not the service waits until an appropriate time, and performs other actions, such as to use this execution thread to download other data to another user. This decision may be time based, e.g., repeat every so many minutes until successful then wait a longer interval, and/or location-based, e.g., attempt if the user has moved a sufficient distance. The update attempt may also take place any time a new reminder is received. Note that the update may be dependent on the device's cache contents, e.g., only send reminders that are known to not be in the cache. The update may be complete so as to renew the entire cache every so often. Further, as described above, the update may be partial so as to provide more relevant reminders, e.g., clear the cache of reminders corresponding to geographic tiles that are now distant/being moved away from, and add new reminders corresponding to geographic tiles that are now closer/being approached.

If the service determines that it is time to download one or more reminders, step 208 represents obtaining the user's current location/context data 112. This may be based upon a request from the service 102 for the information, or the user may regularly be providing the information. Alternatively, the current location/context may be obtained via a prediction, such as according to previous knowledge of the user's plans or historical movement data.

Step 210 represents using this information, as well as any user preference data, to determine which reminder objects to select for download. Note that for brevity herein, steps 208 and beyond assume that the communication between the service 102 and the device 104 is successful; if not successful, the attempt may be retried as appropriate until successful.

The service 102 and the mobile user agent 106 may work together to avoid unnecessary data transmission and/or overflowing the device's cache 330. Thus, for example, the service 102 may decide not to download a reminder if it can reasonably determine that there is no chance the device 104 will trigger the reminder in the near future, e.g., if the user is hundreds of miles from the reminder's location. However, so that a reminder is not missed, the service 102 needs to have some knowledge that the device 104 will be online and able to download any such reminder before it is needed. Historical data may be one such tool, (e.g., the user connects every few minutes) as may the user's current location. For example, if the user is in an area that the service covers well, then the download may be deferred until more likely to be needed. However, if the user is approaching a remote area or the like in which the service 102 does not typically provide good coverage, the service 102 can download any reminders for that area, in case the service 102 may not be able to communicate with the device when in that area.

Once the reminders to download are selected, step 212 locates the associated target objects for those reminders. For example, each object may be accessed to find its target object (or objects), which is then further processed as needed to retrieve the target information for that object. This may be to obtain a single location, or to provide multiple locations, such as multiple grocery stores near the user's current location, or multiple locations where a target product may be purchased.

Step 214 represents downloading the relevant reminder objects and target objects to the user. As mentioned above, this may be a full set, or may be in the form of deltas and/or other data (e.g., remove object instructions) that synchronize the object cache 330 (FIG. 3).

Figure 3:
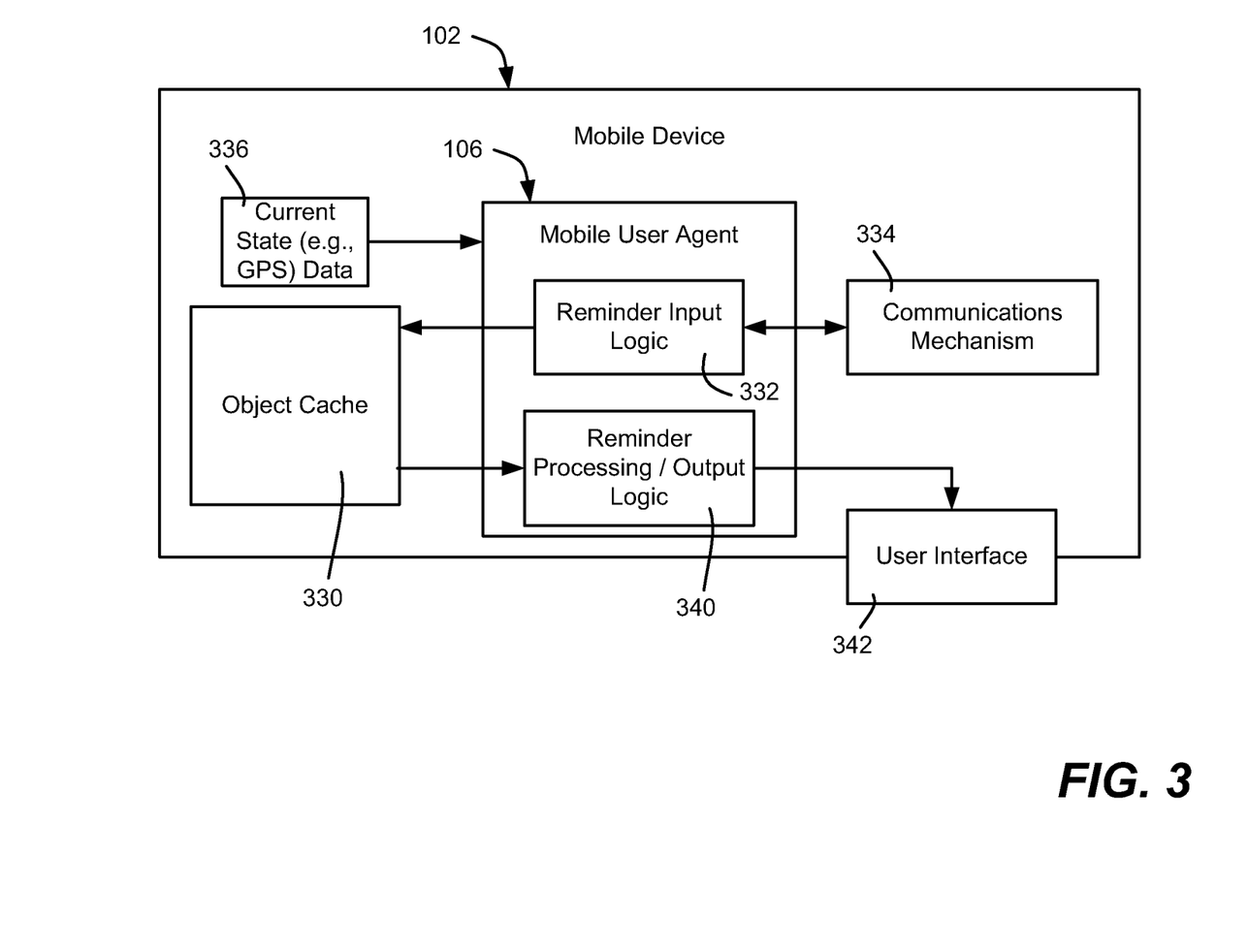
FIG. 3 is a block diagram showing an example implementation of a mobile device that receives and processes reminders and related data so as to output geographic reminders.

FIG. 3 shows various example components within the mobile device 104, including the mobile user agent 106. The mobile user agent 106 includes reminder input logic 332, which in general works with a communications mechanism 334 to cause the device 104 to receive the reminder objects from the service 102 as described above. This may be a push model, e.g., pushed by the service 102 at regular intervals and/or upon location change beyond a threshold, or a pull model, e.g., pulled by the device on demand, or some combination of both. In the example shown in FIG. 3, the reminder input logic 332 caches the reminder objects, as well as any associated target objects, in the object cache 330.

The device 104 provides the mobile user agent 106 with current state data 336, including GPS data, which is used as needed. For example, in a pull model, the current state data 336 may be used to request reminder objects and their associated target objects from the service based on the current time and/or location. The current state data 336 may be used to determine whether and when to update the service 102 with new location/context information 112 (FIG. 1). A significant use of the current state data 336 is by the reminder processing/output logic 340, which determines whether to output a reminder to a user interface 342 (e.g., speaker and/or display screen) of the device 104 based upon the current location of the user, as well as possibly the current time, which are provided by in GPS data and are two of the more commonly evaluated criteria.

Figure 4:
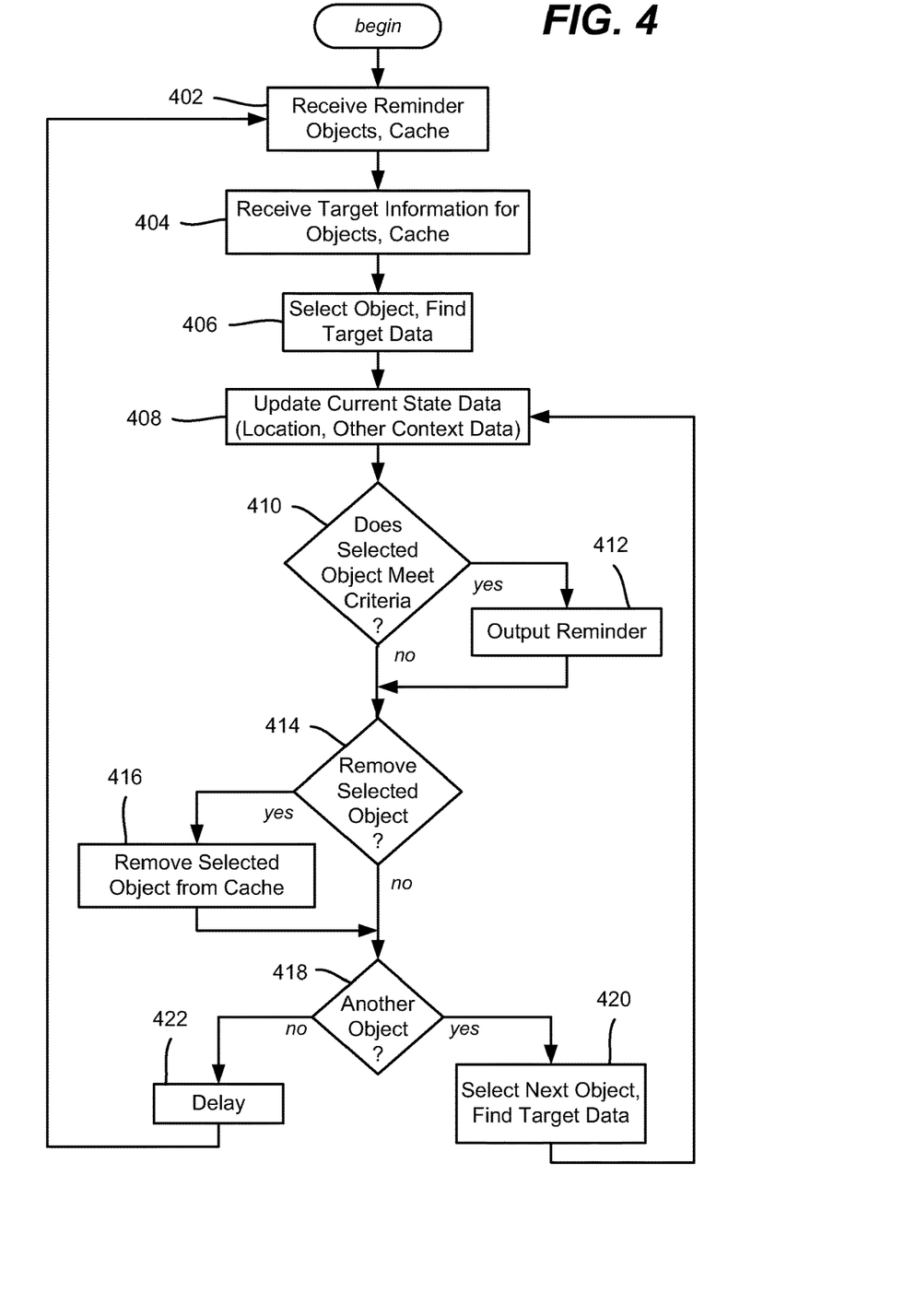
FIG. 4 is a flow diagram representing example steps taken by mobile device logic to process geographic reminders for possible output.

FIG. 4 summarizes example operations of the mobile user agent 106, including receiving and caching the reminder objects (step 402) and the target objects (step 404). Note that steps 402 and 404 are performed by the reminder input logic 332 that fills the cache 330, and are generally not part of processing the reminders in the cache 330, but are shown herein for completeness.

Step 406 represents selecting a reminder object from the cache 330 for processing, as well as selecting the associated target data (object or objects) as identified within that reminder object. Note that as mentioned above, a cache is not strictly necessary, as it is feasible to receive one reminder at a time from the service when the service determines that it is appropriate to send that reminder, but a cache is generally beneficial.

Step 408 represents obtaining the current state data 336 that the logic will use to evaluate against the reminder's criterion or criteria, e.g., location-related information and other context data. Step 410 represents performing the evaluation, which uses the current location as one criterion, and any other state data (e.g., the current time) as one or more other criteria appropriate for that reminder.

Note that it is feasible to merge non-geographic related reminders into the system, such as to allow for some reminders that are only time-based to be included and thereby allow a user to maintain and use only one reminder system. In other words, the geographic reminder service/mobile user agent 106 can also be used for conventional calendar-type reminders in addition to geographic-based reminders.

Further, reminders may be used in conjunction with other applications/features, such as attached to tasks for workflow organization, and for space-time-aware resources classification. Example workflow scenarios may be managed via dependency settings, which may be time-based (first do task X, then Y), space-based (first complete the task at locale X, then another one at Y), or space-time based (with the system having a set of tasks each doable at some locale, and suggesting the next tasks to do to help minimize the travel distance or time).

Virtually any criterion that may be defined and compared against known data may be evaluated at step 410. The evaluation may include combining criteria via Boolean logic or the like, e.g., output a reminder if condition x AND (condition y OR condition z) is met. Templates, forms and the like, with user interface elements such as radio buttons, checkboxes, dialogs, context/hierarchical menus, a natural language parser and so forth may be provided to users to help in specifying such criteria/parameters without requiring them to necessarily have to deal with the triggering logic.

Moreover, part of the criteria may not be entered by the user, but may be a constraint, such as a space/time constraint. For example, given the current speed limit (or combined limits of multiple roads) conditions and/or current traffic conditions, if the logic determines that the user is thirty minutes away from a business that closes in ten minutes, the logic will use such a constraint criterion to prevent that reminder from being output because the constraint cannot be reasonably satisfied.

Step 410 branches to step 412 to output the reminder if the proper criterion or criteria is met. The output is of the form or forms specified in the object, e.g., audio, text and/or the like, delivered in an appropriate way, e.g., as a spoken notification. Note that if step 412 is executed, some delay time or the like after the output concludes may be provided for the user to mentally process the information, e.g., only output one reminder every five seconds. The user may then acknowledge, delete or reschedule the reminder.

Step 414 represents determining whether the reminder is to be removed from the object cache. For example, a reminder may expire by a timestamp, or expire by being output some predetermined number of times (e.g., a one-time-only reminder). Step 416 removes the object if appropriate to do so. Note that another removal mechanism such as a background process or manual cache clearing mechanism may be used instead of or in addition to steps 414 and 416.

Steps 418 and 420 repeat the reminder evaluation process for other reminder objects.

When the reminder objects have been processed once as determined via step 418, the example logic branches to step 422 which represents an optional delay. In general, this allows a limited-power computing device to perform other actions instead of repeatedly processing cached reminders. For example, the reminders may be processed no more than once per minute, although it is feasible to change the delay if the user is moving rapidly or if there are more reminders than can be processed in that timeframe. A reminder object itself may contain information corresponding to how often it needs to be evaluated; for example, if a user is traveling sixty miles per hour (88 feet per second) and a reminder is to be triggered 1,000 feet before reaching a business location, that reminder cannot be delayed for a minute else the business may be passed (possibly by more than 1,000 feet) before it can be output. Further, as described below, one or more reminders may be triggered when the user indicates an interest in a particular entity (person, place or thing), such as by gesturing towards (points the mobile device towards) an entity, scanning or image processing an entity, and so forth.

Turning to another aspect, a user may use the mobile device 104 in other ways that can be discerned and coupled to a geographic reminder, including when relatively stationary. For example, a gesture made with the device may point to a particular person, place or thing, which can then be used to generate a geographic reminder, possibly including providing a user interface dialog that obtains parameters for that geographic reminder. For example, a user may point at a landmark and have that landmark added as a point of interest. As another example, a user may use the device to capture (e.g., scan or image process) a product barcode for a price lookup when shopping, which can automatically generate a reminder such as "pickup rebate form for this product."

Pointing (or other input such as scanning or capturing an image for processing) can also be used to obtain the reminder or reminders related to whatever is being pointed at. For example, if a user points to a discernable entity (e.g., a specific location, a person, or a thing), then the user's current location is known to be in proximity to that entity, and any appropriate reminders for that entity may be output to the user's device (or website, application). The user may then delete or reschedule each such reminder.

Thus, in general, a reminder may be generated by an explicit request to create one, or implicitly by another action related to a person, place or thing. For example, as a user is driving to a destination, the user remembers that the user needs to pick up a prescription on the way back. A geo-reminder may be added (effectively a geo-fence) that will trigger the next time the user comes into this boundary from the opposite direction, e.g., if heading North when the reminder was created, the reminder is to be triggered when traveling down the road headed South, implicitly remembering the return trip.

As another example, consider a user working with word processing document in an enterprise usage scenario. The user may right click on or otherwise select a document in a manner that indicates that the user wants to generate a reminder, such as to "meet with the author in person next week near my building". The system may extract the author name from the document properties, query a server to subscribe for current building location names in which, according to a calendar, the author will be present, and associate these with geographical information from a backing database. A reminder is generated with this information, whereby the user will be alerted anytime during the specified time period when that user is geographically near the correct building at the correct time. More complex chaining and user-driven extensibility is possible, e.g., a macro may extract a list of reviewer's names from a hand-written "document revision history" table, with a reminder generated that alerts the user when any one of those reviewers is near a certain location within a certain timeframe.

Geographic reminders may be shared by pointing the device to another user's device, for direct transmission, or in another way, e.g., by email if the other user's identity can be determined by device-to-device communication (or possibly facial recognition). Further, a user may mark a geographic reminder to be shared within a community, e.g., during travel, a user may point the device around to see if there is any shop selling goods needed within the next three weeks by any member of the family. At a conference event, a user may point the device around to see if there is any talk attended by a business contacts in the next five hours within walking distance. A user may point to an item to get a list of team contacts that have any reminders set on this point of interest.

To set and get geographic reminders, the service may use a mechanism that allows resource classification in space-time. In this manner, a user's documents, files, and so forth may be attributed to specific geographic locations. For example, when planning to visit an area, a user interface theme in a browser or Microsoft® Outlook folders may provide a "local selection" option that presents a user's local notes of an area's restaurants (maintained in files), and acquaintances to possibly visit while in that area (e.g., maintained in Microsoft® Outlook contacts). These may be used to generate reminders. Geographically locatable resources (e.g., people and offices) may be auto-anchored, and multiple geographic locations may be associated with a single resource.

In sum, users set geographic reminders, and get geographic reminders as they move in space and time or point to an entity. Users may acknowledge geographic reminders and/or reschedule them in space and time.

In this manner, GPS-enabled devices are able to obtain reminders from a service to accomplish tasks comprising various actions, each action possibly restricted to specific time and/or space boundaries, possibly subject to user-specific context. Reminders may be attached to geographically tagged entities (people, places, things), and may be combined with not only the current time but also other data (such as the hours of operation of the entity associated with a reminders. A reminder may be issued upon being in the vicinity of a location or pointing to a location.

Exemplary Operating Environment

Figure 5:
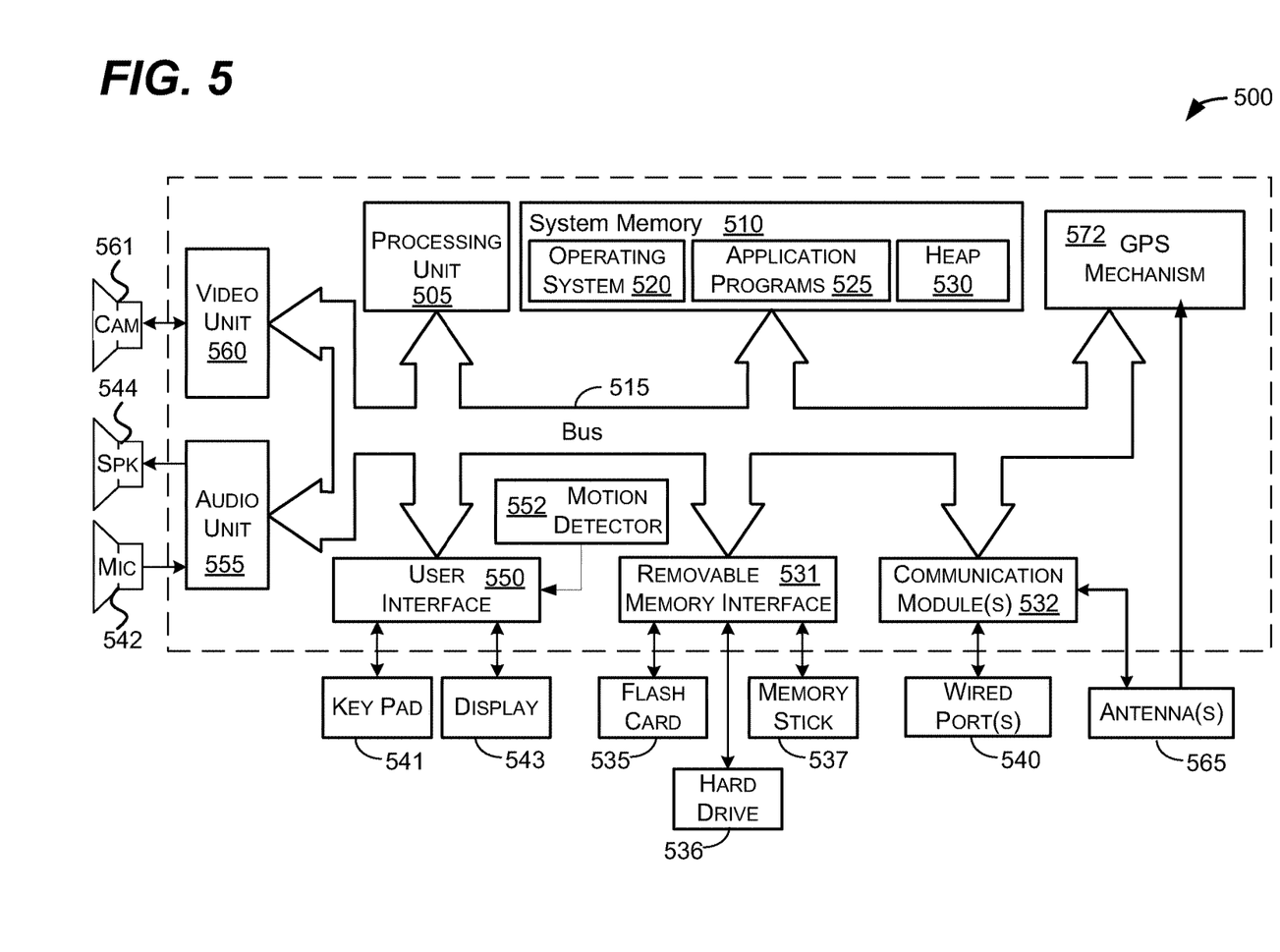
FIG. 5 shows an illustrative example of a mobile computing device/environment into which various aspects of the present invention may be incorporated.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein. Neither should the mobile device 500 be interpreted as having any dependency or requirement relating to any one or combination of components illustrated in the exemplary mobile device 500.

With reference to FIG. 5, an exemplary device for implementing aspects of the subject matter described herein includes a mobile device 500. In some embodiments, the mobile device 500 comprises a cell phone, a handheld device that allows voice communications with others, some other voice communications device, or the like. In these embodiments, the mobile device 500 may be equipped with a camera for taking pictures, although this may not be required in other embodiments. In other embodiments, the mobile device 500 comprises a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system code 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of non-volatile removable memory via a removable memory interface 531, or may be connected via a universal serial bus (USB), IEEE 5394, one or more of the wired port(s) 540, or antenna(s) 565. In these embodiments, the removable memory devices 535-537 may interface with the mobile device via the communications module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-537 and their associated computer storage media, discussed above and illustrated in FIG. 5, provide storage of computer-readable instructions, program modules, data structures, and other data for the mobile device 500. For example, the removable memory device or devices 535-537 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communications module(s) 532 and wired port(s) 540. Motion detection 552 can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
receiving current location information and context data associated with historical movement data for a mobile device,
receiving, by the mobile device, a reminder from a remote computing device that maintains a plurality of reminders;
determining, by the mobile device, whether to output an alert corresponding to the reminder to a user interface of the mobile device, including:
evaluating one or more criteria associated with a user profile that includes user preference data against current state data that includes current location information and a direction of movement associated with the mobile device;
responsive to a determination that the one or more criteria are satisfied, selecting at least a portion of target data within the reminder and outputting the selected portion of the target data with the alert to the user interface of the mobile device;
detecting a pointing of the mobile device to a geographical feature;
generating a new reminder based on the pointing of the mobile device to the geographical feature; and
transmitting the new reminder to the remote computing device.

2. The method of claim 1 wherein evaluating the one or more criteria comprises evaluating the user-specified parameters including at least one of a resource-specific parameter, system-specific parameter, time-specific parameter, locality-specific parameter, or priority-specific parameter.

3. The method of claim 1 wherein the one or more criteria include target-related information corresponding to a category, and wherein evaluating the criteria comprises determining whether the current location-related data indicates a threshold proximity to any entity that corresponds to that category.

4. The method of claim 1 wherein the one or more criteria include target-related information corresponding to a location having specified hours of operation, wherein the current state data includes current time, and wherein evaluating the one or more criteria includes comparing the specified hours of operation against the current time to determine if the one or more criteria associated with the reminder are satisfied.

5. The method of claim 1 wherein the one or more criteria include target-related information corresponding to a trigger area proximity associated with the user-specified parameters, and wherein evaluating the one or more criteria includes comparing the current location-related data for the mobile device against the trigger area proximity to determine if the one or more criteria associated with the reminder are satisfied.

6. The method of claim 1 wherein the one or more criteria include a user gesture, and wherein evaluating the one or more criteria includes evaluating the detected motion made with the user device against the current state data and one or more entities corresponding to the current state data.

7. The method of claim 1 wherein the one or more criteria include an image scanned by the mobile device, and wherein evaluating the one or more criteria includes evaluating the image scanned against the user-specified parameters to determine whether to output the alert corresponding to the reminder.

8. A computing device, comprising:
a memory and a processor that are respectively configured to store and execute processor-executable instructions to cause the computing device to:
obtain current location information and context data associated with a user device, the context data obtained via a prediction based on historical movement data;
identify a set of one or more reminders associated with the current location information, the context data, and user preference data:
select at least a portion of the set of one or more reminders to download to the user device based at least in part on the current location information, the context data, a direction of movement associated with the user device, and the user preference data;
identify another set of one or more reminders cached on the user device;
select at least a portion of the other set of one or more reminders cached on the user device to remove from the user device based upon at least one of the direction of movement associated with the user device, a speed of movement associated with the user device, or a learned user habit associated with the user device; and download the selected portion of the set of one or more reminders to the user device and remove the selected portion of the other set of one or more reminders from the user device.

9. The computing device of claim 8 wherein the processor-executable instructions are also to cause the computing device is to:
  locate target objects associated with the selected portion of the set of one or more reminders;
  retrieve target information for the associated target objects; and
  download the retrieved target information and the associated target objects along with the selected portion of the set of the one or more selected reminders to the user device.

10. The computing device of claim 8 wherein the processor-executable instructions are also to cause the computing device to:
  determine a plurality of geographic tiles from the current location information, and select at least the portion of the set of one or more selected reminders to download based upon whether an individual reminder corresponds to a location within one of the geographic tiles.

11. The computing device of claim 8 wherein the user preference data includes at least one of a resource-specific preference, system-specific preference, time-specific preference, locality-specific preference, or priority-specific preference.

12. The computing device of claim 8 wherein other context data is obtained based on a user gesture detected by the user device.

13. The computing device of claim 8 wherein other context data is obtained based on an image scanned by the user device.

14. One or more computer storage media storing computer-executable instructions, which in response to execution by a computing device, cause the computing device to perform operations, the operations comprising:
  caching, by a mobile device, one or more reminders received from a reminder service on a local cache of the mobile device;
  detecting, by the mobile device, a pointing of the mobile device directed towards a person, place, or thing;
  generating, by the mobile device, a new reminder associated with the person, place, or thing pointed to with the mobile device;
  caching the new reminder;
  determining, by the mobile device, whether criteria associated with a cached reminder have been satisfied; and
  outputting an alert corresponding to the cached reminder to a user interface of the mobile device responsive to determining that the criteria associated with the cached reminder are satisfied, the criteria including user preference data, a current location of the mobile device, historical movement data associated with the mobile device, and a direction of movement associated with the mobile device.

15. The one or more computer storage media of claim 14, wherein the operations further comprise:
  providing the new reminder to the reminder service.

16. The one or more computer storage media of claim 14 wherein the user preference data includes at least one of a resource-specific preference, system-specific preference, time-specific preference, locality-specific preference, or priority-specific preference.

17. The one or more computer storage media of claim 14 wherein the one or more criteria associated with the reminder includes a space-time constraint that prevents outputting of the alert if the mobile device cannot satisfy a location-related criterion associated with the reminder by a certain time, given traveling conditions with respect to at least one of a current location, current time, current direction, or current speed of the location-aware mobile device.

18. The one or more computer storage media of claim 14 wherein the reminder is associated with a product, and wherein the operations further comprise:
  outputting an alert for that reminder upon identifying that product via a scanning, gesturing or image processing operation.

19. The computing device of claim 8, wherein the service is a cloud service, and wherein the user device is communicatively coupled to the cloud service.

20. The method of claim 1, wherein generating the new reminder based on the pointing of the mobile device further comprises:
  translating at least some input data received at the mobile device into a relevant query to submit to the remote computing device, the relevant query further extracting relevant parameters at the remote computing device based at least in part on other user experiences of other user interaction with the remote computing device to facilitate setting the new reminder at the remote computing device.

* * * * *